(12) United States Patent
Shehri et al.

(10) Patent No.: US 11,480,517 B2
(45) Date of Patent: Oct. 25, 2022

(54) HEAT EXCHANGER FOULING DETERMINATION USING THERMOGRAPHY COMBINED WITH MACHINE LEARNING METHODS

(71) Applicant: Saudi Arabian Oil Company, Dhahran (SA)

(72) Inventors: Ali Al Shehri, Thuwal (SA); Vincent Cunningham, Thuwal (SA); Ayman Amer, Thuwal (SA); Wei Xu, Thuwal (SA); Faisal Melibari, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 715 days.

(21) Appl. No.: 16/535,849

(22) Filed: Aug. 8, 2019

(65) Prior Publication Data
US 2021/0041347 A1   Feb. 11, 2021

(51) Int. Cl.
*G01N 17/00* (2006.01)
*G06N 3/08* (2006.01)
(Continued)

(52) U.S. Cl.
CPC .............. *G01N 17/008* (2013.01); *G01J 5/00* (2013.01); *G06N 3/0454* (2013.01); *G06N 3/08* (2013.01);
(Continued)

(58) Field of Classification Search
CPC ... F28F 2200/00; G01N 17/008; G06N 20/00; G06N 3/088; G06N 3/08; G06N 3/02
See application file for complete search history.

(56) References Cited

U.S. PATENT DOCUMENTS 5,030,790 A   7/1991 Sergienko et al.
5,792,895 A   8/1998 Commereuc et al.
(Continued)

FOREIGN PATENT DOCUMENTS

AU    B-21332/88         2/1989
WO    WO-2021148391 A  * 7/2021

OTHER PUBLICATIONS

Sebastian Dudzik, "Investigations of a heat exchanger using infrared thermography and artificial neural networks", Sensors and Actuators A: Physical, vol. 166, Dec. 22, 2010. (Year: 2010).*
(Continued)

*Primary Examiner* — David A. Rogers
(74) *Attorney, Agent, or Firm* — Leason Ellis LLP

(57) ABSTRACT

Disclosed is a methodology for determination and prediction of heat exchanger fouling, such as polymer fouling in the circulation loop that forms part of the heat exchanger system. The buildup of a polymer or other undesired material deposit in the heat exchanger provides a distinctive temperature signature (thermal gradient) on the surface of the heat exchanger asset, which is visualized using a thermographic camera. Coupling images (thermograms) from the camera with a machine learning algorithm identifies fouling and, with knowledge of the historical data of the asset and operating and ambient conditions, enables prediction of future fouling. The thermal images provide several types, or orders, of temperature information that are indicative of locations vulnerable to fouling. In one case, the method uses machine learning applied to time-based temperature change/gradient information to detect hidden polymer fouling in areas that form part of the heat exchanger asset.

20 Claims, 3 Drawing Sheets

(51) Int. Cl.
  *G06N 20/20* (2019.01)
  *G01J 5/00* (2022.01)
  *G06N 3/04* (2006.01)
  *H04N 5/33* (2006.01)
  *G01J 5/48* (2022.01)

(52) U.S. Cl.
  CPC .............. *G06N 20/20* (2019.01); *H04N 5/33* (2013.01); *G01J 5/48* (2013.01)

(56) References Cited

U.S. PATENT DOCUMENTS

| | | | |
|---|---|---|---|
| 5,877,376 A | 3/1999 | Commereuc et al. | |
| 9,499,455 B2 | 11/2016 | Magna et al. | |
| 10,295,284 B2 | 5/2019 | Hanov et al. | |
| 11,112,349 B2* | 9/2021 | Amer | G01N 17/006 |
| 11,156,354 B2* | 10/2021 | Vasseur | G01N 17/008 |
| 11,169,080 B2* | 11/2021 | Kroner | G05B 23/0221 |
| 2007/0267175 A1 | 11/2007 | Yeganeh et al. | |
| 2013/0176418 A1* | 7/2013 | Pandey | H04N 5/33 |
| | | | 348/E5.09 |
| 2016/0320291 A1 | 11/2016 | Najjar et al. | |
| 2017/0336156 A1 | 11/2017 | Phillips | |
| 2018/0051945 A1* | 2/2018 | Hanov | F28G 15/003 |
| 2018/0280914 A1 | 10/2018 | Victor et al. | |
| 2018/0283818 A1 | 10/2018 | Victor et al. | |
| 2019/0101342 A1 | 4/2019 | Victor et al. | |
| 2021/0140695 A1* | 5/2021 | Terzic | F28G 15/003 |

OTHER PUBLICATIONS

Sreenath Sundar et al., "Fouling modeling and prediction approach for heat exchangers using deep learning", International Journal of Heat and Mass Transfer, vol. 159, Jul. 21, 2020. (Year: 2020).*

International Search Report and Written Opinion in Corresponding PCT Application. PCT/US2020/045424 dated Oct. 27, 2020. 10 pages.

Krzywicki, A. et al. in K.J. Smith and E C. Sanford (Ed.), Progress in Catalysis (Studies in Surface Science and Catalysis, vol. 73), Elsevier, Amesterdam, 1992, pp. 155-160.

Al-Sa'doun, Abdul Wahab. "Dimerization of ethylene to butene-1 catalyzed by Ti (OR') 4-AIR3." Applied Catalysis A: General 105.1 (1993): 1-40.

Kotov, S. V., and I. N. Kankaeva "Commercial production and principal trends in the use of 1-butene." Chemistry and Technology of Fuels and Oils 30.5 (1994): 240-245.

Petrochemical Processes 2010, Hydrocarbon Processing, Gulf Publishing Company, Houston (TX).

* cited by examiner

HEAT EXCHANGER FOULING DETERMINATION USING THERMOGRAPHY COMBINED WITH MACHINE LEARNING METHODS

FIELD OF THE DISCLOSURE

The present disclosure relates in general to nondestructive inspection technologies, and in particular to methods for determining and predicting the levels of fouling of a heat exchanger (such as polymer fouling) using thermography combined with machine learning.

BACKGROUND OF THE DISCLOSURE

The function of a heat exchanger is to cool or heat one medium (e.g., fluid) using another, in which heat dissipation occurs at the surface of the equipment separating the two mediums. Over time, undesired materials are deposited in the heat exchanger, a process referred to as fouling. Fouling negatively impacts both the thermal and mechanical performance of the heat exchanging process. Fouling degrades the thermal performance by, for example, increasing the thermal resistance and lowering the efficacy of heat transfer. Fouling degrades the mechanical performance by, for example, increasing the pressure drop across the heat exchanger, increasing the pumping power needed, and reducing the flow of fluids. Fouling is also known to increase corrosion rates in heat exchangers.

Heat exchangers are used in a variety of applications, including oil and gas, petrochemicals, desalinization, and heat-intensive applications undergoing water cooling. Common and important applications in the chemical and petrochemical industry are related to polymerization and polymer processing for plastics. Here, heat exchangers can be used to cool process fluids (such as precursor streams) using a metallic surface in the heat exchanger. In addition to helping dissipate heat, the metallic surface acts as a desired reaction catalyst, e.g., to help form desired monomers and comonomers for the polymer processing from the precursor streams. However, undesired chemical reactions (such as unwanted polymerizations) often occur when the chemicals in the process fluid contact the metallic surface. This can cause a buildup of unwanted material (polymers) on the surface of the heat exchanger.

By way of example, short chain alpha olefins, such as 1-butene, 1-hexene, and 1-octene, are important comonomers for the polyolefin industry. Alpha olefins can be produced via non-selective ethylene oligomerization processes or on-purpose ethylene di-, tri-, and tetramerizations utilizing homogeneous transition metal-based catalysts and aluminum-based co-catalysts. However, such reactions are often accompanied with undesired polymerizations. The formed polymeric material usually results in reactor fouling, which can lead to frequent reactor shutdowns and cooling loop cleanings. The fouling significantly impacts production of desired alpha olefins. Another operational challenge of the alpha olefin production process is that the operators do not have any means to observe the reactor fouling directly. Therefore, it is not known when the reactor has to be shut down for maintenance.

It is in regard to these problems in the art that the present disclosure is directed to provide a technical solution for effective determination of heat exchanger fouling (such as polymer fouling) and, in some implementations, remediation of same.

SUMMARY OF THE DISCLOSURE

According to an embodiment, a method of training a machine learning circuit is provided. It should be noted that the machine learning circuit can be, for example, a custom hardware circuit, a programmable logic circuit, or a computer processor configured with code or other logic to carry out the tasks assigned to the circuit. For instance, the machine learning can be a mathematical algorithm configured to run on a computer (such as a personal computer (PC) or high performance PC). The method includes: cleaning a reactor, setting up a thermographic (thermal) camera facing the reactor or components of the reactor that are known to have polymer buildup over time, returning the reactor to service, acquiring data over time (e.g., continuously, or periodically, such as several images per day, several sequences per day, several sequences per week, etc.) using the thermal camera. As more is known about the polymer build up, the amount of acquisition time and the number of thermograms captured can be reduced or optimized.

For example, the machine learning circuit can be tested for efficiency (e.g., percent accuracy) at different time intervals. To illustrate, the machine learning circuit can be tested for output accuracy for continuous operation, and that number compared to the output accuracy for different periodic operations, such as for one hour each day, one hour every two days, one hour every week, etc. As accuracy improves across the different operation frequencies, less frequent data acquiring can be employed without degrading the efficiency of the learning.

The method further includes operating the reactor for one maintenance lifecycle (e.g., to collect the full information on the polymer build up), and performing maintenance on the reactor. The maintenance includes examining the areas affected by polymer fouling, and quantifying the volume of polymer fouling as it relates to the thermograms. The method further includes using this quantified data to train the machine learning circuit on the thermal gradients and how the gradients are related to the examined levels of polymer fouling. After the asset testing and inspection (T & I) is performed, the process is repeated (e.g., cleaning the reactor, returning the reactor to service, acquiring more data over time, etc.) During this phase (and succeeding phases), the machine learning circuit identifies polymer fouling based on what it has learned from the previous training periods.

It should be noted that machine learning is very dependent on the amount of data and the quality of data used to train. For example, the above process can be carried out at several locations (such as different reactors), on different parts of the reactors, and the like, to generate more data and better quality data, and to make the algorithm more efficient. The data acquired after each T & I can be used to further train and enhance the model over time.

According to another embodiment, a method for inspection of a first heat exchanger is provided. The method includes: acquiring, by an infrared camera, first thermograms over time of a first outer surface of the first heat exchanger; determining, by a prediction circuit, a first fouling of a first inner surface of the first heat exchanger using the first thermograms, the first inner surface being underneath and in thermal contact with the first outer surface; and outputting, by the prediction circuit, an indication of the first fouling. The prediction circuit is built from training data (or training set) using a machine learning process. The training data includes second thermograms of a second outer surface of a second heat exchanger acquired over time. The second thermograms exhibit no fouling of a first portion of a second inner surface of the second heat exchanger and exhibit a second fouling of a second portion of the second inner surface. The second inner surface is underneath and in thermal contact with the second outer surface.

In an embodiment, the method further includes: acquiring, by corresponding sensors, first environmental data of the first heat exchanger corresponding to the first thermograms. Determining the first fouling includes using the first environmental data. The training data further includes second environmental data of the second heat exchanger corresponding to the second thermograms.

In an embodiment, the machine learning process includes: determining, by a training circuit, weights corresponding to the second environmental data, the weights respectively representing correlations of the second environmental data to affect the second thermograms; and building, by a machine learning circuit, the prediction circuit using the weights to compensate the first thermograms by the first environmental data when determining the first fouling.

In an embodiment, determining the first fouling includes determining an extent of the first fouling. The first fouling extent includes one or more of a length, a width, a depth, and an area. Outputting the indication of the first fouling includes outputting the first fouling extent. The training data further includes an extent of the second fouling. The second fouling extent includes one or more of a length, a width, a depth, and an area.

In an embodiment, determining the first fouling includes determining a type of the first fouling. Outputting the indication of the first fouling includes outputting the first fouling type. The training data further includes a type of the second fouling.

In an embodiment, the first fouling type and the second fouling type each include polymer fouling.

In an embodiment, the training data further includes simulated or modified third thermograms of a third outer surface of a third heat exchanger. The third thermograms are simulated or modified to exhibit a third fouling of a third inner surface of the third heat exchanger. The third inner surface is underneath and in thermal contact with the third outer surface.

In an embodiment, the machine learning process includes: a convolutional neural network (CNN) to classify temperature gradients of input thermograms into different degrees of fouling; and a recurrent neural network (RNN) to detect patterns in the temperature gradients of the input thermograms over time.

In an embodiment, the machine learning process further includes: an adaptive boosting technique to be used in conjunction with the CNN and the RNN to achieve higher accuracy of fouling predictions of heat exchangers.

According to another embodiment, a system for inspection of a first heat exchanger is provided. The system includes: a set of first thermograms acquired over time using an infrared camera, the thermograms being of a first outer surface of the first heat exchanger; and a prediction circuit. The prediction circuit can comprise code executing in a processor which configures the processor to: determine a first fouling of a first inner surface of the first heat exchanger using the first thermograms, the first inner surface being underneath and in thermal contact with the first outer surface; and output an indication of the first fouling. The prediction circuit is built (configured) from training data using a machine learning process. The training data includes second thermograms of a second outer surface of a second heat exchanger acquired over time. The second thermograms exhibit no fouling of a first portion of a second inner surface of the second heat exchanger and exhibit a second fouling of a second portion of the second inner surface. The second inner surface is underneath and in thermal contact with the second outer surface.

In an embodiment, the system further includes: sensor data comprising first environmental data acquired from the first heat exchanger which correspond to the first thermograms. The prediction circuit is further configured to determine the first fouling by using the first environmental data. The training data further includes second environmental data of the second heat exchanger corresponding to the second thermograms.

In an embodiment, the system further includes: a training circuit configured to determine weights corresponding to the second environmental data, the weights respectively representing correlations of the second environmental data to affect the second thermograms; and a machine learning circuit configured by code to build the prediction circuit using the weights which compensate the first thermograms by the first environmental data when determining the first fouling.

In an embodiment, the prediction circuit is further configured to: determine an extent of the first fouling, the first fouling extent including one or more of a length, a width, a depth, and an area; and output the first fouling extent. The training data further includes an extent of the second fouling. The second fouling extent includes one or more of a length, a width, a depth, and an area.

In an embodiment, the prediction circuit is further configured to: determine a type of the first fouling; and output the first fouling type. The training data further includes a type of the second fouling.

In an embodiment, the first fouling type and the second fouling type each include polymer fouling.

In an embodiment, the training data further includes simulated or modified third thermograms of a third outer surface of a third heat exchanger. The third thermograms are simulated or modified to exhibit a third fouling of a third inner surface of the third heat exchanger. The third inner surface is underneath and in thermal contact with the third outer surface.

In an embodiment, the machine learning process includes: a convolutional neural network (CNN) to classify temperature gradients of input thermograms into different degrees of fouling; and a recurrent neural network (RNN) to detect patterns in the temperature gradients of the input thermograms over time.

In an embodiment, the machine learning process further includes: an adaptive boosting technique to be used in conjunction with the CNN and the RNN to achieve higher accuracy of fouling predictions of heat exchangers.

In an embodiment, the system further includes: a preprocessing circuit comprising code executing in a processor to apply a noise filter to the first thermograms to reduce effects from noise prior to determining the first fouling.

In an embodiment, the system further includes: a wireless communication device configured to communicate between the infrared camera and the prediction circuit. The wireless communication device is attached to the infrared camera to receive thermograms therefrom.

According to another embodiment, a method for inspection of a heat exchanger is provided. The method includes: acquiring, by an infrared camera, thermograms over time of an outside of the heat exchanger; determining, by a prediction circuit, a fouling of an inside of the heat exchanger using the thermograms; and outputting, by the prediction circuit, an indication of the fouling. The prediction circuit is built from a machine learning process that learns from training data. The training data includes other thermograms acquired over time of an outside of at least one heat exchanger. The acquisition time of the training data includes a first time when an inside of the at least one heat exchanger exhibits no fouling and a second time when the inside of the at least one heat exchanger exhibits fouling.

According to another embodiment, a system for inspection of a heat exchanger is provided. The system includes: a set of thermograms acquired over time using an infrared camera, the thermograms being of an outside of the heat exchanger; and a prediction circuit including code executing in a processor. The code configures the processor to: determine a fouling of an inside of the heat exchanger using the thermograms; and output an indication of the fouling. The prediction circuit is built from a machine learning process that learns from training data. The training data includes other thermograms acquired over time of an outside of at least one heat exchanger. The acquisition time of the training data includes a first time when an inside of the at least one heat exchanger exhibits no fouling and a second time when the inside of the at least one heat exchanger exhibits fouling.

Any combinations of the various embodiments and implementations disclosed herein can be used. These and other aspects and features can be appreciated from the following description of certain embodiments of the invention and the accompanying drawings and claims.

Figure 1:
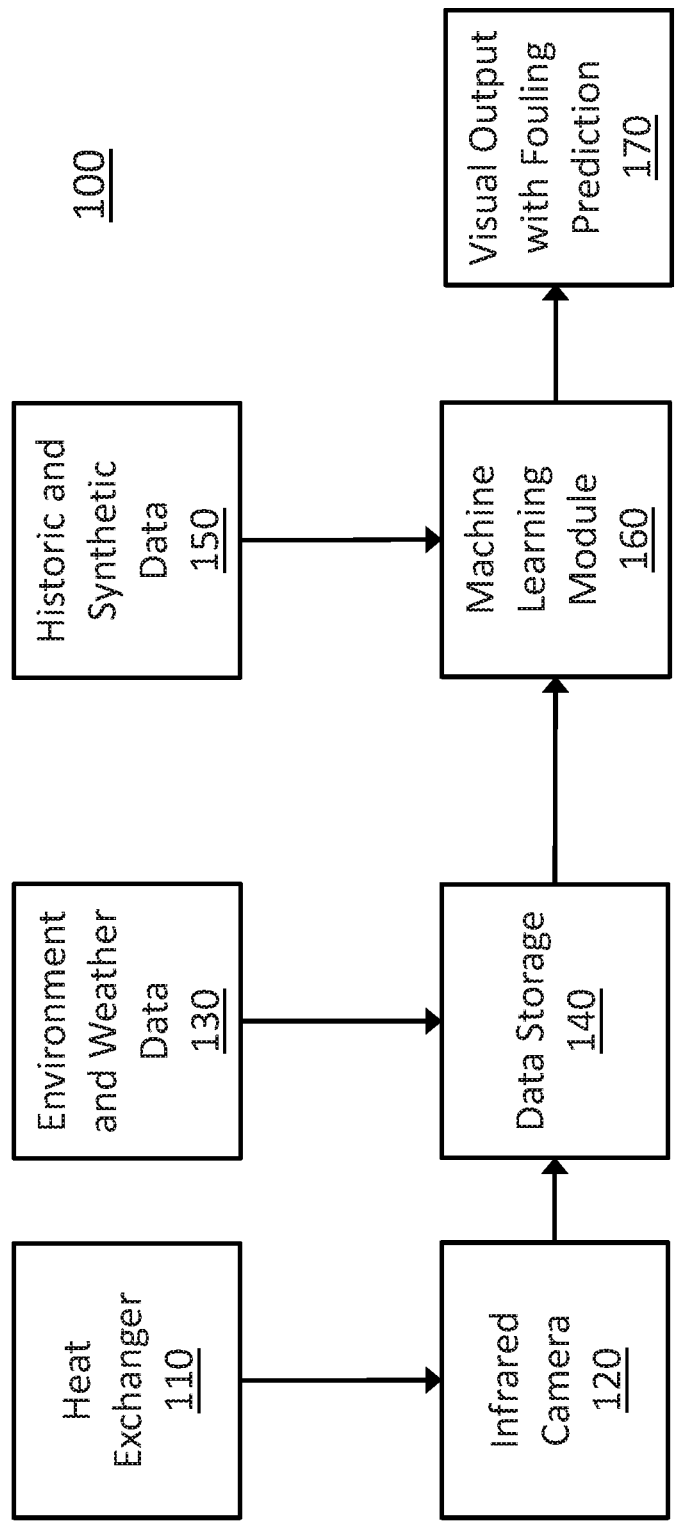
FIG. 1 is a block diagram of an example technique for determining heat exchanger fouling using infrared thermography (IRT) and machine learning, according to an embodiment of the present invention.

It is noted that the drawings are illustrative and not necessarily to scale.

DETAILED DESCRIPTION OF CERTAIN EMBODIMENTS OF THE DISCLOSURE

Example embodiments of the present disclosure are directed to a methodology for determination and prediction of heat exchanger fouling, such as polymer fouling in a circulation loop that forms part of the heat exchanger system. For instance, the buildup of the polymer (an undesired material deposit in the heat exchanger) provides a distinctive temperature signature (such as a thermal gradient) on the surface of the heat exchanger asset. This can be visualized using a thermographic camera, such as an infrared camera or other thermal sensor. In an embodiment, these images (or thermograms) from the camera are coupled with a machine learning algorithm trained by data to recognize the distinctive signatures of such images that are indicative of fouling. Not only does this system identify fouling in a nondestructive manner, but with knowledge of the historical data of the asset, and operating and ambient conditions about the asset, the system can also predict the presence of fouling. By determining the presence, type, and extent of fouling, both presently and in the future, costly maintenance of such assets can be optimized to minimize expenditure on inspection and cleanup. Accordingly, the reactor shutdown for cleanup can be predicted and therefore, the high maintenance cost and production downtime can be avoided.

This is in contrast to other solutions to address fouling. For example, maintenance can be routinely performed on a set schedule for heat exchangers susceptible to fouling. Here, the maintenance has to be regular enough to prevent significantly bad fouling from building up. However, this can lead to overly frequent inspections and cleanings, and unnecessary expense. Another solution is adding catalyst modifiers to prevent, for example, the formation of the ultrahigh molecular weight polyethylene. However, such modifiers not only suppress the formation of undesired polymers, they also subdue the activity of the desired catalyst (e.g., to produce desired alpha olefins).

As such, according to an embodiment of the present disclosure, a predictive approach for detecting and/or determining the extent of polymer fouling in a heat exchanger asset is provided. The approach considers dependent and independent surrounding variables of the heat exchanger. In the approach, thermal images of investigated assets are captured over time. As a series of thermal images of the same or overlapping area(s) are captured over time, changes in phenomena can be readily observed within the images, including the impact of temporary issues such as wind. The thermal images can provide several types, or orders, of temperature information that can be indicative of locations vulnerable to fouling or presently undergoing fouling. For example, a first order of temperature information is regular temperature (T) data revealed by the color/radiometric values shown in the thermal images (or thermograms). A second order of temperature information is changes in temperature ($\Delta T$), such as the temperature contrasts exhibited between different regions. A third order of information is rate of change in temperature analytics, $df(T)/dt$, as determined by analysis of a series of thermal images over time.

The thermal gradient indicates the presence of polymer fouling in the internal structure of the reactor and reactor network (e.g., connecting pipelines). As the polymer layer insulates the structure from temperature transmission to the surface, the thermal gradient shows areas where polymer fouling is present. Predicting the behavior of the polymer fouling is achieved using historical data. Over time and with the buildup of polymer materials internally on the asset, the temperature gradient changes. This change in temperature gradient and rate of change of temperature gradient change is expected to be consistent as the process of these assets is well known and in continuous operation.

Any anomalies in the temperature gradient can indicate abnormal buildup of polymer materials on the inside of the reactor and provides inspectors with advance warning (or predictive warning) of issues occurring or about to occur. In addition, unexpected or abnormal changes in polymer buildup based on historical data can also provide operators with an indication that something has changed in the process. Example changes include changes in feedstock, changes in process parameters, and incorrect function of elements within or external to the asset. This predictive behavior provides advance warning to operators of possible issues that may lead to greater issues if not remedied in time.

In an embodiment, additional evaluations are performed with an independent non-destructive testing (NDT) technique, such as, for example, electromagnetic detection at other portions of the electromagnetic (EM) spectrum, magnetometry, and the like, to determine correlative relationships. This sensor fusion increases the accuracy of polymer fouling determination as well as shadow detection, abnormal process activities, and the like, the effects of which can be minimized. As used herein, sensor fusion refers to the fusion or gathering of data from multiple sensor sources.

The machine learning techniques accept data and extract features from the data. The machine learning techniques are trained with data, such as real data or synthetic data (e.g., data made up to look like real data). The data can be, for example, thermograms from a thermographic camera, x-ray images, ultrasound data, and the like. The combination of all the data enhances the accuracy of the machine learning techniques.

In an embodiment, ambient condition data such as time of day, process conditions, to name a few, can be included as parameter inputs to machine learning algorithms that are used to generate determinations from the multiple sources of input. Additionally, in some embodiments, to reduce the effects of noise in the thermal images caused by shadows, reflections, or other artifacts, a noise filter is employed as a preprocessing step.

Through the combination of sensor fusion and time-based analysis, in an embodiment, non-determinative or confounding variables are excluded, allowing the learning algorithms to identify anomalies and abnormalities that are contrary to ambient conditions, and are thus more likely indicative of fouling by applying a selected algorithm to the data, as discussed next. Such anomalies and abnormalities are recorded, for example, in a non-transitory medium, such as a disk drive or solid-state drive. Later, field engineers can perform verification inspections on the locations where such anomalies/abnormalities occur. The results of the field inspections, such as locations where fouling was verified and locations where fouling was not verified, can be stored, for example, locally or on cloud-based platforms and used to train supervised machine learning systems. This enables the systems to become more intelligent over time as parameters (e.g., weights, factors) are refined over time in a continually more encompassing data set.

A number of different machine learning algorithms in different combinations can be used without limitation. In some embodiments, the machine learning methodology is applied to thermographic imaging for determining heat exchanger fouling. Artificial intelligence (AI) uses machine learning (ML) and deep learning (a subset of machine learning) to create intelligent systems. Machine learning is used to make predictions based on its ability to learn from previous data (such as training data). This previous/historical data is fit to different models using algorithms. There are several known algorithms that are used. These include (but are not limited to) convolutional neural networks (CNNs), recurrent neural networks (RNNs), ensemble learning methods such as adaptive boosting (or AdaBoost) learning, decision trees, support vector machines, and any other supervised learning algorithm.

One embodiment of a machine learning process includes a combination of a CNN and an RNN. For example, CNNs are useful for stratifying (e.g., classifying) thermal images into abstraction levels (e.g., different degrees of heat exchanger fouling) according to image topology, while RNNs are useful for detecting patterns over time. Both factors are important, as embodiments are directed to detecting temperature gradients and determining their development over time. In addition, in some embodiments, boosting algorithms, such as AdaBoost, can be used in conjunction with CNNs and RNNs to achieve higher accuracies at the expense of more computation time. Since mistakes can result in costly and unnecessary inspections, increasing accuracy at the sacrifice of computation time can be an acceptable trade-off. In addition, boosting can help in the designing phase of CNNs. Hence, a secondary goal of boosting is to aid in selecting the right architectures for CNNs and RNNs.

According to an embodiment, a nondestructive testing (NDT) technique for determination of polymer fouling in a heat exchanger based on a machine learning approach is provided. The technique senses infrared (IR) radiation emitted by the heat exchanger, such as through infrared thermography (IRT) using an IR camera. The technique further includes a controller configured to generate thermograms from the sensed infrared radiation, and a communication device to transmit data (e.g., wirelessly) to a computing device for thermographic analysis. Conditions in the exterior surfaces of heat exchanger components undergoing (or soon to undergo) fouling have different thermal signatures. IR imaging (thermograms) is an effective basis for the programmed method of the present disclosure to identify a thermal gradient in the thermogram when a heat exchanger component (such as a circulation loop) is fouled or about to experience fouling. In addition, the spectra of the emitted IR signals reveal information about the type and extent (e.g., mass, thickness, blockage, diameter, area, to name a few) of any detected fouling in the heat exchanger from the thermal signatures.

In an embodiment, a method for identifying and determining the extent of fouling of a heat exchanger is provided. The method includes receiving thermograms from the heat exchanger using an infrared camera, applying filters to the thermograms using a first machine learning system (e.g., training module, expert system), initially determining fouling conditions based on output from the filters, and validating the initial fouling classification by an inspection of the heat exchanger. The first machine learning system is trained using results of the validation until a first threshold for heat exchanger fouling classification accuracy is reached. Outputs of the first machine learning system and additional structural and environmental data are fed into a second machine learning system (e.g., prediction module) that incorporates information from earlier states into current states. The second machine learning system is trained to identify heat exchanger fouling according to changes in the outputs of the first machine learning system and the additional data over time until a second threshold for heat exchanger fouling classification accuracy is reached. The determination and prediction of heat exchanger fouling for the scanned area is thereafter identified using the first and second machine learning systems in coordination.

FIG. 1 is a block diagram of an example technique 100 for determining fouling of a heat exchanger 110 using infrared thermography (IRT) and machine learning, according to an embodiment of the present invention. The technique 100 includes the heat exchanger 110 to be inspected in a nondestructive fashion. The heat exchanger 110 can be, for example, part of a petrochemical facility, an oil refinery, a gas processing facility, a desalination facility, or the like. The heat exchanger 110 has various circulation loops or paths for exchanging heat between two fluids.

The inspection takes place with a thermographic (e.g., infrared or IR) camera 120, such as a photographic device capable of making images out of received (and focused) thermal radiation from a scene (such as of the heat exchanger 110). The thermal radiation can be a subset of the IR spectrum (e.g., thermal IR), such as electromagnetic radiation having a wavelength between 3 micrometers (µm)

and 15 µm. The heat exchanger 110 is located in front of the passive IR camera 120 (thermal camera), where the input to the camera 110 is the temperature emissions/reflections of the heat exchanger 110. In an embodiment, a FLIR Systems Industrial thermographic camera is used for the IR camera 120. Images (thermograms) from the IR camera 120 are stored in data storage 140, such as a network-accessible storage device (e.g., disk drive, flash drive). The output of the camera 120 is an image containing a heat map of the heat exchanger 110. This image (data) is stored in the data storage 140. This and other such images are sent to a previously trained machine learning module 160 for analysis by way of a processor executing code which configures the processor to perform an analysis on the thermograms and other data being provided to the algorithm being employed.

In an embodiment, the IR camera 120 is part of IR sensing system including a power supply (e.g., battery) and an electronics box. These components can be physically and electrically connected to each other. In an embodiment, the electronics box contains communication modules and a microcontroller. The electronics box is connected to the IR camera 120 to perform a wireless function and communications with an operator computer. The mode of communication can be through, for example, Wi-Fi, radio frequency (RF), Bluetooth, or Zigbee protocols to achieve two-way data transmission between the detection system and the operator control unit. The wireless communication can also include live video feed, which helps in increasing mobility by avoiding entanglement.

In an example measurement and analysis procedure, the IR camera 120 is positioned in front of the heat exchanger 110, where the camera 120 is focused on the area of interest. The camera 120 captures a video/image sequence of the heat exchanger 110 that displays the thermal behavior (e.g., thermal gradient) of the heat exchanger 110. In an embodiment, the IR camera 120 is set to capture an image of the heat exchanger 110 every two seconds over time periods ranging from 10 minutes to 30 minutes. In an example test, fluctuations in the temperature caused by changes in pressure and flow (of the liquid in the heat exchanger) are simulated by using an electric heating 'blanket whose temperature fluctuated in a controlled manner by up to 30% of the maximum temperature over the acquisition period.

The data (e.g., raw thermal images/videos of the heat exchanger 110) is saved as data sets on data storage 140 and used as input to the machine learning module 160 to analyze the images over time. In addition, other sensors or detectors, such as for environmental (e.g., operation of the heat exchanger) or weather (e.g., ambient temperature, shadow, wind, dust, and the like) conditions obtain relevant environment and weather data 130. In an embodiment, the environment and weather data 130 is also stored on data storage 140 and provides information which is suitable for the processor implementing the machine learning code to conditions that affect the generated thermograms, but which are not detected by analysis of the IR camera 120 thermograms by themselves. The machine learning module 160 is trained to detect and predict fouling in circulation loops of a heat exchanger (such as the heat exchanger 110) using historic data 150 acquired (and validated) from earlier testing and inspections of such heat exchangers. The historic data 150 is also stored in a network-accessible non-transitory storage device such as a disk drive. The newly-acquired thermograms of the heat exchanger 110 from the IR camera 120 can also get added to the historic data 150, such as for future training after any corresponding anomalies or abnormalities are verified or validated.

In further detail, the sensed thermal data from the IR camera 120 can be used to form thermograms whose signature characteristics are amenable to machine learning techniques. Accordingly, in some embodiments, manufactured or enhanced fouling conditions (e.g., of different types, sizes, and depths) are used as input to an expert system module, to train the module to associate fouling conditions of certain types, sizes, and depths with their corresponding thermograms. Size can be, for example, one or more of length, width, diameter, and area (such as surface area), to name a few. This machine learning can then be applied through a prediction module comprising code executing in a processor which, when presented with new thermograms of a heat exchanger (such as a circulation loop or path of a heat exchanger), identifies and characterizes (with accurate type, size, and/or depth approximations) fouling conditions of the heat exchanger that is being nondestructively inspected. As such, fouling determination, quantification, and prediction are automatically performed via a thermographic analysis program based on a machine learning approach installed on a portable device such as a computer or tablet, and wirelessly connected to an inspection apparatus.

In an embodiment, the historic data 150 further includes synthetic data 150, which is also used to train the machine learning module 160. The historic data 150 can be, for example, actual thermograms (and corresponding environment and weather data) from other cameras, systems, or time periods, of situations useful for training the machine learning module 160. By contrast, the synthetic data 150 can be, for example, simulated conditions or thermograms, such as of simulated anomalous or abnormal situations. The synthetic data 150 can nonetheless be useful for training the machine learning module 160 to predict actual anomalous or abnormal situations (e.g., indicative of fouling) in heat exchangers, such as when actual historic data of such situations is not available.

The machine learning module 160 can be all or part of a computing device (such as a laptop, a workstation, a tablet, a smartphone, part of a server, or a dedicated hardware circuit, as in an FPGA or ASIC, or the like). The images (or thermograms) recorded in the data storage 140 are uploaded into the machine learning module 160 using, for example, a wired or wireless network accessible to the computing device hosting the machine learning module 160. The machine learning module 160 implements a machine learning algorithm, which can be implemented by code executing in a hardware processor, to process the image data (thermograms) and environment and weather data from the data storage 140. The machine learning module 160 detects and predicts (including determining the type and/or extent of) anomalies and other abnormalities indicative of fouling of the heat exchanger 110 from the uploaded thermograms.

The machine learning module 160 is trained using historic and synthetic data 150. As such, the machine learning module 160 has code which processes the historic data so as to learn to recognize anomalous or abnormal temperature patterns in the thermograms indicative of fouling of the heat exchanger 110 (or of conditions that could soon lead to fouling if not addressed). The machine learning module 160 also learns to recognize the type (e.g., fouling material) and the extent of the fouling, such as the depth and/or the surface area of the detected fouling. For example, selected examples of fouled conditions in the heat exchanger can be more rigorously inspected to identify the actual type and extent of the fouling. The data from these validation and verification inspections can then be fed into the learning process so that the machine learning module 160 can accurately estimate or identify such fouling types and extents from thermographic and environmental data. In a similar vein, precursor conditions can be identified (and the machine learning module 160 trained to recognize) from anomalous data and corresponding inspections, that lead to more serious fouling if not addressed soon.

In some embodiments, the machine learning module 160 is trained using known and controlled data (such as thermal gradients from circulation loops with known fouling and clean circulation loops with no fouling). In one such embodiment, to enhance the accuracy of the machine learning module 160, synthetic data 150 is generated for training purposes. The synthetic data 150 includes, for example, images with known superimposed thermal patterns at different angles and orientations indicative of fouling. The accuracy of the machine learning module 160 depends significantly on the quantity, quality, and variety of the data in the training sets. As part of the training, the machine learning module 160 further learns which environment and weather parameters contribute significantly to the thermographic analysis, and which can be disregarded.

The technique 100 further includes visual output with fouling predictions 170. The machine learning module 160, having trained on the different training data, applies the training to real thermograms to detect, determine the type and extent of, and predict fouling of the heat exchanger 110. These results 170 are output visually to help with inspection, repair, and preventative actions of the heat exchanger 110. The output 170 of the machine learning module 160 provides useful information such as the type, likelihood, or extent of fouling along with highlighting areas where abnormalities/anomalies are occurring or predicted to occur. In an embodiment, the output 170 of the machine learning module 160 is an image containing the original heat map (thermogram) of the heat exchanger 110 with the prediction profile for fouling along with any abnormalities/anomalies.

Figure 2:
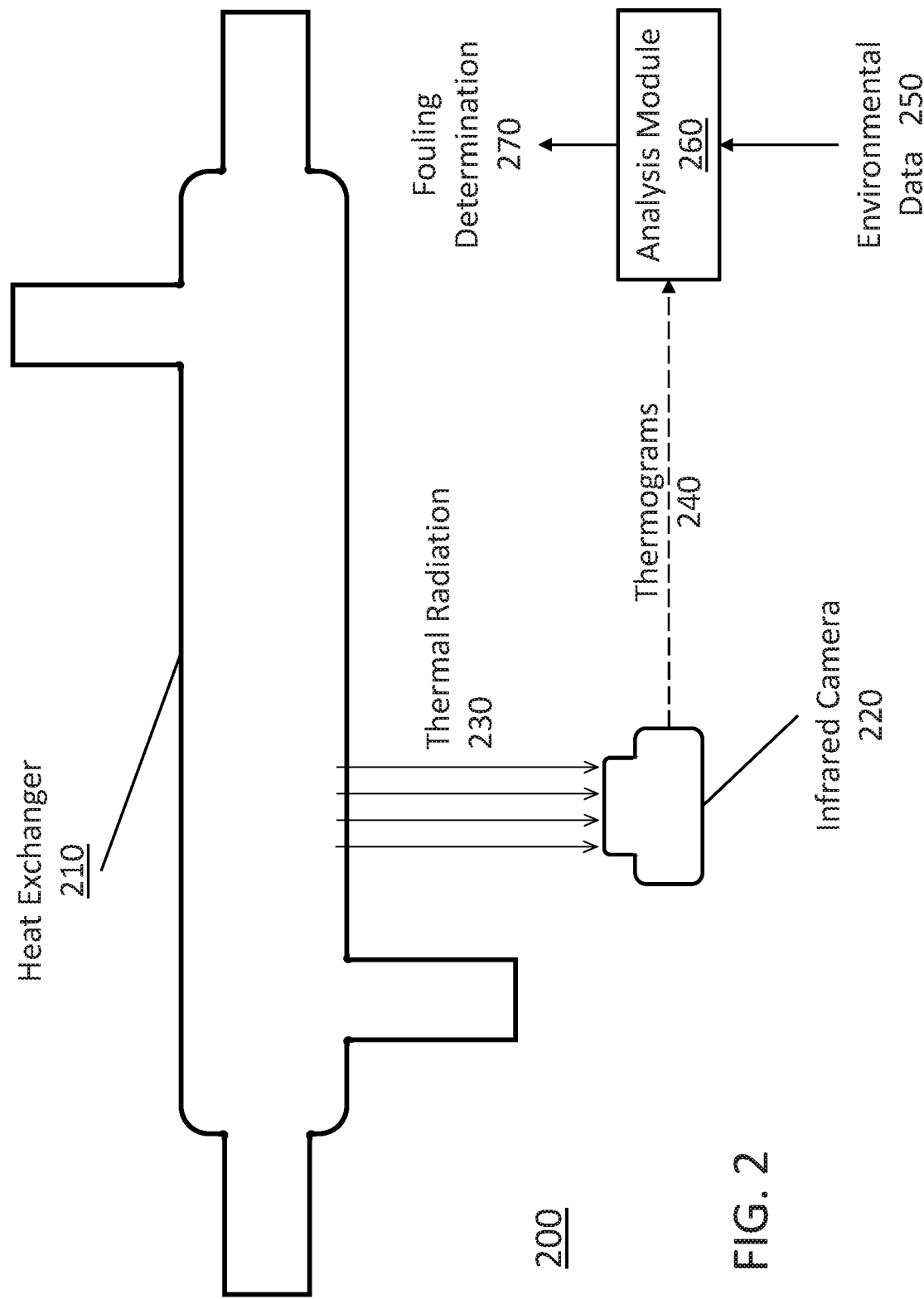
FIG. 2 is a schematic view of an example system for determining fouling in a heat exchanger using IRT and machine learning, according to an embodiment of the present invention.

FIG. 2 is a schematic view of an example system 200 for determining fouling in a heat exchanger 210 using IRT and machine learning, according to an embodiment of the present invention.

The heat exchanger 210 transfers heat from one fluid (liquid or gas) to another. For example, petrochemical processing such as olefin production can involve cooling heated petroleum products to produce desired olefins. This cooling can take place in large heat exchangers, whose walls are lined with catalysts to aid the olefin production. However, the creation of desired olefins can also come with the undesired production of polymers, which also line the heat exchanger walls, leading to fouling of the heat exchanger. Fouling degrades the efficiency of the production process. While fouling is virtually inevitable in the production process, the treatment of fouling (namely, partial disassembly, inspection, and cleaning of the heat exchanger) is time- and resource-intensive. Fouling can also be localized, appearing in some portions of the heat exchanger but not in others. As such, regular systematic cleaning of the entire heat exchanger, though effective at treating fouling, can be cost prohibitive.

In accordance with an embodiment, the cost associated with fouling treatment is significantly reduced or minimized through external nondestructive testing (NDT) of the heat exchanger 210, but from a technical point of view, the embodiment is able to better enable more optimum utilization of heat exchangers by identifying, on a fouling-informed basis, an appropriate time to service the unit. The NDT uses an infrared camera 220 to capture thermograms (thermographic images) 240 of emitted infrared (thermal infrared) radiation 230 from the heat exchanger 210. When clean, the heat exchanger 210 emits different thermal signatures than when fouled. In addition, the heat exchanger 210 emits different thermal signatures for different degrees of fouling. Further, the heat exchanger 210 emits different thermal signatures for different locations along the heat exchanger 210, and for different environmental conditions 250 including weather (e.g., wind, sun, rain, and the like). For ease of description, location, environmental, and weather-related parameters, that can vary between thermograms, may simply be referred to as environment/environmental data or conditions throughout.

As such, according to an embodiment, key parameters 250 (e.g., environmental data) affecting the thermal signature of the heat exchanger 210, together with current thermograms 240 of the heat exchanger 210, are provided to a machine learning analysis module 260. The thermograms 240 (or other thermographic imaging data) can be transmitted wirelessly, for example, to the analysis module 260. The wireless transmission can be by, for example, Wi-Fi, radio frequency (RF), Bluetooth, or Zigbee protocols to achieve two-way data transmission between the infrared camera 220 and the analysis module 260. The analysis module 260 is a machine learning component that has been trained to analyze thermograms 240 and key environmental data 250 and to determine 270 if and to what extent the heat exchanger 210 (at the location corresponding to the thermogram 240) is subject to or will be subject to fouling. The analysis module 260 outputs these fouling determinations 270 and predictions for use, for example, in deciding whether, when, and the location at which a heat exchanger 210 is to be inspected and possibly cleaned.

As part of the machine learning technique, a training module is built from thermographic data (training data) acquired over time of representative portions of one or more representative heat exchangers. The training module can be taught, for example, using machine learning algorithms such as convolutional neural networks (CNNs), recurrent neural networks (RNNs), ensemble learning methods (such as AdaBoost learning), decision trees, support vector machines (SVMs), or any other supervised learning algorithm. In addition, other parameters (e.g., further training data, such as environmental conditions, ambient conditions, process conditions, and the like) corresponding to the thermograms (and their locations on the heat exchanger) are supplied with the thermographic data as part of the training data to the training module.

From this training data, the training module includes code which configures a processor to build a mathematical model based on the training data in order to make fouling determinations or predictions without being explicitly programmed to do so. Heat exchanger inspections, to verify the correct determinations and identify the incorrect determinations to the training module, are used as part of the supervised learning process. From this verification and identification, the training module identifies those parameters that are non-determinative or confounding, to establish the most useful subset of the parameters for determining or predicting fouling. The training module, using additional code executing in the processor, also adapts or adjusts its weights and factors to correctly match the inspected data from the corresponding thermograms and key environmental data. The resulting training (e.g., weights, factors, and the like) is used to build the analysis module 260 so that the analysis module 260 can make accurate determinations 270 and predictions regarding fouling of the heat exchanger 210.

Figure 3:
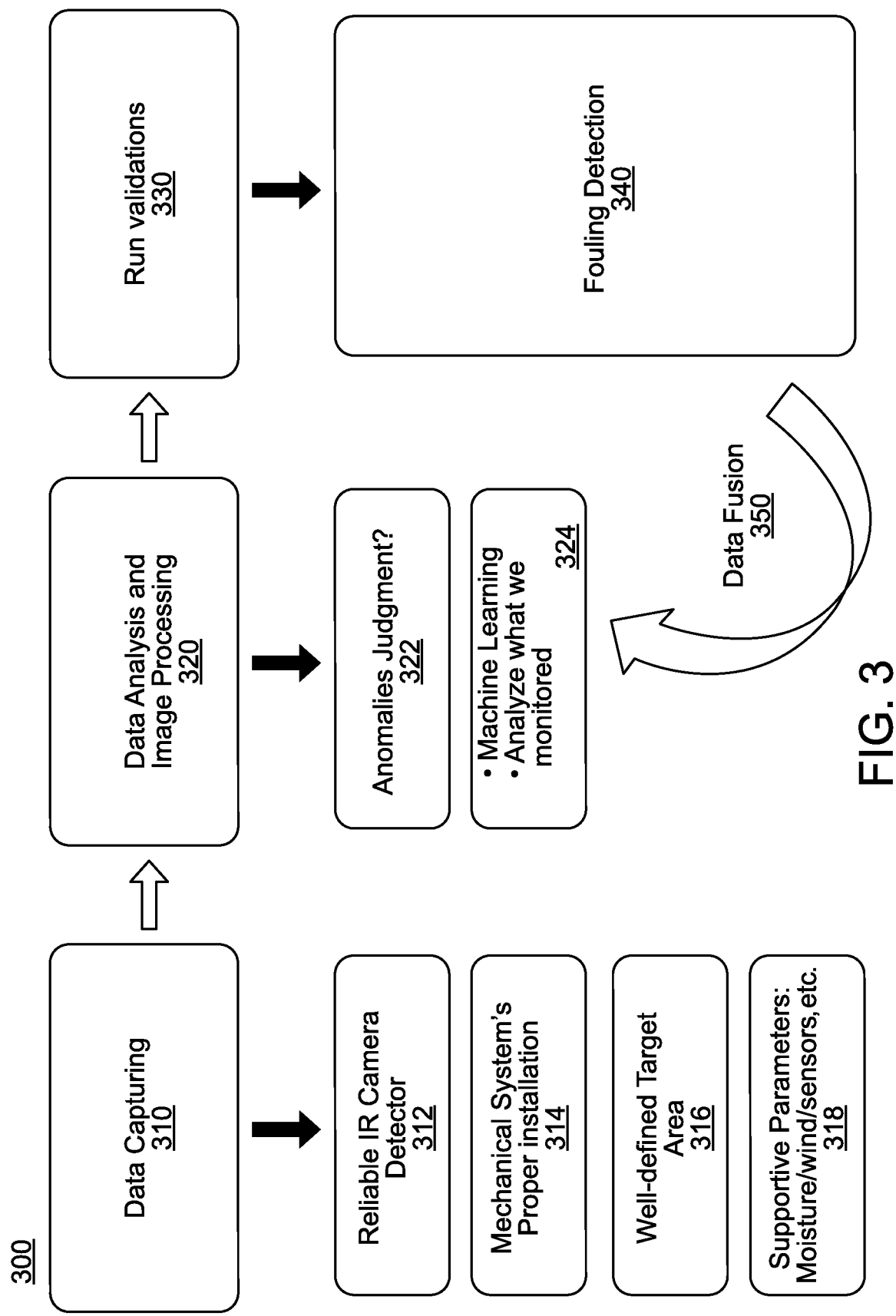
FIG. 3 is a schematic illustration of an example technique for determining fouling in a heat exchanger using IRT and machine learning, according to another embodiment of the present invention.

FIG. 3 is a schematic illustration of an example technique 300 for determining fouling in a heat exchanger using IRT and machine learning, according to an embodiment of the present invention.

Although this methodology is not limited to a specific combination of machine learning algorithms, an example embodiment uses a combination of CNNs and RNNs and, if applicable, Adaboost. CNNs are useful for classifying input images (such as thermograms) into abstraction levels (e.g., degrees of fouling) according to the image topology. RNNs, on the other hand, are useful for detecting patterns over time. Both of these factors are important for training. CNNs, for example, can detect the appearance of hotspots, while RNNs can capture the creation and development of these hotspots over time.

The CNN learns by validation and backward propagation. In an embodiment, after training, the CNN is able to accurately classify areas of an input thermogram into corresponding classifications (such as preset classifications) based, for example, on extent of fouling, type of fouling (e.g., polymer), length (and/or width), area (such as surface area), to name a few. While the CNN is an efficient and useful methodology for stratifying input images into abstraction levels according to the thermogram image topology, it is not as well suited for detecting patterns over time. Accordingly, in an embodiment, an RNN is used in association with the CNN to improve time-based pattern recognition. The RNN can be used to detect changes to thermograms over time, and to account for environmental variables. These variables can be introduced as parameters into the RNN along with the thermogram data. For instance, the distance between the IR camera and the heat exchanger can be one such variable; the ambient temperature can be another.

In some embodiments, a boosting algorithm, such as Adaboost, is used in conjunction with CNNs and RNNs to achieve higher accuracies at the expense of more computation time. Boosting, for example, can combine and improve a large number of weak learners, through re-weighting, to produce a strong learner. While this can increase computation time versus, for example, longer training periods for the CNNs and RNNs, longer training periods increase the number of incorrect determinations and predictions, whose corresponding inspections can be quite costly. Accordingly, increasing accuracy at the sacrifice of computation time can be an acceptable trade-off. In addition, boosting can help in the designing phase of CNNs. Hence, a secondary goal of boosting is to aid in selecting the right architectures for CNNs and RNNs.

Turning now to FIG. 3, a technique 300 commences with data capture 310 to obtain representative thermographic images (thermograms) and other environmental inputs of the heat exchanger being inspected or monitored. For this, a reliable IR camera detector 312 is used to produce the thermographic sensor data. The IR camera 312 records an image by sensing thermal IR radiation, such as electromagnetic radiation having a wavelength between 3 micrometers (μm) and 15 μm, emitted (or reflected) by objects in its field of view. To reduce or minimize unintended variation between thermograms, consistency is increased through proper installation 314 of the mechanical system. This includes, for example, mounting the IR camera in consistent positions relative to the imaged locations, performing the thermography at consistent times of the day, generating the thermograms consistently (e.g., same IR color mapping), and the like. The thermograms and other data are acquired over time, to aid in uncovering trends that are apparent only when compared to data collected in similar situations previously.

In addition, the use of well-defined target areas 316 helps improve technique 300, such as locations along the heat exchanger that are easy to image and present IR signatures that fluctuate significantly due to activity within the heat exchanger. These can include, for example, areas more prone to fouling, hotter portions of the heat exchanger (e.g., closer to the hot input), larger sections of the heat exchanger (e.g., more likelihood of exposing anomalies), areas easier to pinpoint and identify (e.g., more consistency in results in similar environments), and the like. Further, data on supportive parameters 318 (such as precipitation, wind, ambient temperature, and from other weather or environmental sensors) should also be collected, as it can affect the thermograms even though their effects are primarily exterior to the heat exchanger. The machine learning program can be configured to learn or otherwise factor in such data to lessen the chance that changes in thermograms due to environmental conditions affects the analysis of the thermograms. Again, the thermograms and other data are collected over time to acquire sufficient examples of different environmental or weather distortions of the thermographic data.

Technique 300 further includes data analysis and image processing 320 of the captured thermograms and other supportive (e.g., environmental, weather) data. This includes anomalies judgment 322, which uses machine learning techniques from earlier data and validations to decide when (and to what degree) anomalous conditions are being sensed, especially conditions that likely indicate fouling of the heat exchanger. Data from when the heat exchanger is performing normally (e.g., new or recently cleaned) forms a baseline. Anomalies from this for which known environmental or weather effects cannot account are flagged as likely to be fouling-related. Depending on factors such as confidence levels (e.g., how repeatable are the anomalies, are they one-time or indicative of a degrading trend, and the like) and significance (e.g., unaccountable magnitude of the deviations from normal or baseline), decisions can be made by the analysis program to inspect (and possibly clean) the heat exchanger.

Throughout the data analysis and image processing 320, machine learning 324 is applied, to analyze the collected data. Initially, a training module is built from the data, to learn to identify normal conditions and abnormal (e.g., likely fouled) conditions. Each location of the heat exchanger being monitored exhibits its own thermal signatures while the heat exchanger is actively processing. The primary contributor to the IR signature is the heat emitting from one of the two fluids taking part in the heat exchange. However, other environmental or weather-related conditions can also affect the resulting thermograms. By acquiring data over time, the training module can learn which environmental parameters affect (and to what extent) the thermographic data.

In response to the data analysis and image processing 320, such as when anomalies are identified, validations 330 (such as inspections and cleanings) are run to verify the conditions are indicative of fouling 340, and to what extent. From these validations, the training module learns (e.g., weights more heavily) factors or conditions that lead to actual fouling, or that precede (e.g., predict) actual fouling. Likewise, the training module learns (e.g., weights less or disregards) factors or conditions that led to false positives (e.g., unverified fouling anomalies). In this manner, the training module gradually learns to determine and predict fouling when it is detected (or about to take place). To aid in this, data fusion 350 from multiple sensor types (e.g., weather sensors and other environmental conditions) and correlative techniques (e.g., other electromagnetic radiation detection or magnetometry) can be used to provide further inputs for the machine learning 324 to use in determining and predicting the levels of fouling. From this, an analysis module is built for more regular nondestructive monitoring of the heat exchanger.

In an example system according to an embodiment, an IR camera and a processing device (e.g., computer, hardware logic, customized gate logic or circuit) configured to carry out an analysis program are provided. The analysis program extracts useful information out of collected IR images pointing out polymer fouling vulnerable areas with the aid of a machine learning algorithm. The analysis program also factors in environmental or other situational data of the thermograms that further distinguish fouling from non-fouling conditions.

According to some embodiments, example features include one or more of the following. When the heat exchanger is frequently monitored (such as continuously monitored), vulnerable locations that pinpoint polymer fouling spots can be identified from an analysis of the IR images. In addition, focused annual inspection plans (accurately costed) can be implemented according to the monitoring outcomes and image processing results, limiting such inspections to locations having a high likelihood of fouling. Moreover, an integrated thermography and machine learning approach provides for an intrinsically safe detection and monitoring technique and system. Further, the method can be a real-time monitoring technique (and not just a regular survey), filming the polymer fouling creation and journey in all types of conditions. Such an approach provides for a powerful technique, capable of being implemented with little or no sophisticated equipment and with little human intervention. It also provides for a scientific evidence-based monitoring and detection through automatic interpretation of data (e.g., using heat transfer analysis and environmental data-based analysis).

These features further include eliminating manual inconsistencies inherent in more human-based approaches. In addition, such techniques provide for a simple and valuable approach: monitor heat exchanger assets and predict (such as determine the extent of) polymer fouling. These IR evaluation techniques work well when the temperature in the system is substantially different (plus or minus) than the ambient temperature. Moreover, anomalies found by IR can be evaluated further using other techniques (to enhance fouling determination and prediction through data fusion with other diagnostic indicators or correlating information).

To properly analyze the thermograms, as much data as possible or practical should be considered. Accordingly, some embodiments incorporate one or more of the following considerations of dependent/interdependent variables and factors. These include ambient varying temperature (e.g., temperature of the surrounding environment). Further temperatures include the fluid temperatures in the heat exchanger structure. The heat exchanger structure (physical) characteristics can also be important, such as the diameter, insulation types, and their thermos-physical properties. Besides ambient temperature, other weather conditions should be considered, such as precipitation (e.g., rain, dust, and the like), wind speed, sunlight, to name a few. Another consideration is the distance between the IR camera and the heat exchanger. Regarding suspected fouling, the fouling critical locations should be considered, as well as the fouling growth direction (such as whether it is in the source to destination direction).

Temperature change ($\Delta T$) data can be considered for different locations, spots, and conditions (the more such data, the better, as it is useful, e.g., distinguishing the different factors from each other). Another consideration is the historical/recent recorded data of monitoring (e.g., the same location and/or conditions). The presence of voids in the outer surface can also be considered. One thing that can be looked for is the tendency of factors such as the anomalies and the temperature (e.g., whether they are increasing, decreasing, or remaining the same). It can also be considered if the analysis is better on-line (e.g., in real time, or while acquiring the data) or off-line (e.g., during shut down of the heat exchanger). The considerations further include emissivity and reflections effects. For example, IR images sometimes show warm spots that are caused by reflections. In addition, the IR thermal pattern on the surface of the heat exchanger can be caused by heat conducted from the warm inner structure to the outer metal jacket. However, the image may include reflections and conduction from various sources. Heat flows through many materials to provide distinct thermal signatures.

Additionally, the heat exchanger structure and geometry should be considered. In some embodiments, this is determined during the research phase since there are many factors to be considered in the monitoring and prediction. To that end, long-time monitoring can be a factor for better results. Techniques in accordance with one or more embodiments provide an easy contact-free detection, determination, and prediction method. In such techniques, unexpected shutdowns and incidents are avoided by developing an early detection approach. According to some embodiments, polymer fouling detection and determination, despite being a hidden threat, is provided through a combination of nondestructive infrared thermography and machine learning. According to some such embodiments, monitoring, predicting, detecting, and determining the extent of polymer fouling using thermographic techniques by applying machine learning is provided. Such time-based monitoring and machine learning concepts combine to provide for a better, more efficient tool to address heat exchanger fouling (such as polymer fouling).

The fouling rates in the heat exchanger are calculated based on observed characteristics (e.g., changes in flow rates and temperatures) for the targeted location over time. In some embodiments, the methodology includes thermography combined with machine learning, for measuring, identifying, and learning the thermal conditions leading to undesired or compromised heat exchanger performance due to fouling effects. These fouling effects include clogging of the circulation loop, blocking of the desired catalyst surfaces, inadequate exchange of heat between the two input fluids, and the like. Each of these effects has a different thermal signature appearing in thermograms. By measuring, identifying, and learning these thermal conditions, accurate predictions can be made to when other areas are experiencing (or will soon experience) such effects. IR thermography is an effective method to detect thermal gradient when a heat exchanger is compromised, such as from polymer or other fouling. From these thermal signatures, corresponding fouling extents (e.g., sizes, depths) for different types of fouling can be estimated accurately using a machine-learning model with predefined fouling conditions learned from earlier training.

The above and other embodiments confer many benefits to addressing problems related to fouling in heat exchangers. For example, when frequently monitored (such as continuously), vulnerable locations susceptible to fouling can be identified by analyzing IR images. In addition, periodic (such as annual) inspection plans can be implemented according to the monitoring outcomes and image processing results. Because of their nondestructive aspects and amenability to automated operation, these techniques can be intrinsically safe for determining and monitoring heat exchangers for fouling. In some embodiments, real-time monitoring is performed, not just occasional surveying. This real-time monitoring can allow filming of the fouling creation in all conditions to which the heat exchangers are likely to be exposed.

Furthermore, many of the proposed techniques need no sophisticated equipment and require little human intervention. Nonetheless, these techniques perform challenging image processing and data interpretation. These techniques use scientific evidence-based monitoring and detection by interpreting data (e.g., data-based analysis). As such, these techniques can eliminate or significantly reduce manual inconsistency that can take place. The resulting tool from this thermography and machine learning combination can provide a simple yet valuable approach: monitor heat exchangers and predict locations of present (or future) fouling. Further, when the temperature in the heat exchanger is substantially different (higher or lower) than the ambient temperature (which is usually the case for heat exchangers), the IR evaluation method performs well. In addition, anomalies found by IR thermography and machine learning can be further evaluated using other EM sensing or magnetometry, providing for a correlative approach.

According to some embodiments, IR thermography is combined with machine learning through time-based monitoring to provide a nondestructive technique for identifying and characterizing fouling (such as polymer fouling) in a heat exchanger. This fouling might otherwise go undetected until more serious consequences result. The techniques are cost effective since frequent inspections (and possible cleanings) to otherwise address the fouling can be expensive and time-consuming. The techniques provide for simple and informative methods and apparatuses for indicating the presence of fouling in heat exchangers, plus information can be acquired from the heat exchanger's surface temperature profile to indicate and characterize the type of fouling and its extent.

It is to be understood that any structural and functional details disclosed herein are not to be interpreted as limiting the systems and methods, but rather are provided as example embodiments and/or arrangements for helping teach one of ordinary skill in the art one or more ways to implement the systems or methods.

The methods described herein may be performed by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes may be made, and equivalents may be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

What is claimed is:

1. A method for inspection of a heat exchanger, the method comprising:
   acquiring, by an infrared camera, thermograms over time of an outside of the heat exchanger;
   determining, by a prediction circuit, a fouling of an inside of the heat exchanger using the thermograms; and
   outputting, by the prediction circuit, an indication of the fouling, wherein
   the prediction circuit is built from a machine learning process that learns from training data,
   the training data comprises other thermograms acquired over time of an outside of at least one heat exchanger, and
   the acquisition time of the training data includes a first time when an inside of the at least one heat exchanger exhibits no fouling and a second time when the inside of the at least one heat exchanger exhibits fouling.

2. The method of claim 1, further comprising acquiring, by one or more sensors, environmental data of the heat exchanger that corresponds to the thermograms, wherein
determining the fouling comprises using the environmental data, and
the training data further comprises other environmental data of the at least one heat exchanger that corresponds to the other thermograms.

3. The method of claim 2, wherein the machine learning process comprises:
determining, by a training circuit, weights corresponding to the other environmental data, the weights respectively representing correlations of the other environmental data to affect the other thermograms; and
building, by a machine learning circuit, the prediction circuit using the weights, which compensate the thermograms by the environmental data when determining the fouling.

4. The method of claim 1, wherein
determining the fouling comprises determining an extent of the fouling, the fouling extent comprising one or more of a length, a width, a depth, and an area,
outputting the indication of the fouling comprises outputting the fouling extent, and
the training data further comprises an extent of the exhibited fouling of the at least one heat exchanger, the exhibited fouling extent comprising one or more of a length, a width, a depth, and an area.

5. The method of claim 1, wherein
determining the fouling comprises determining a type of the fouling,
outputting the indication of the fouling comprises outputting the fouling type, and
the training data further comprises a type of the exhibited fouling of the at least one heat exchanger.

6. The method of claim 5, wherein the fouling type and the exhibited fouling type each comprise polymer fouling.

7. The method of claim 1, wherein
the training data further comprises simulated or modified thermograms of the outside of the at least one heat exchanger, and
the simulated or modified thermograms are simulated or modified to exhibit another fouling of the inside of the at least one heat exchanger.

8. The method of claim 1, wherein the machine learning process comprises:
a convolutional neural network (CNN) to classify temperature gradients of input thermograms into different degrees of fouling; and
a recurrent neural network (RNN) to detect patterns in the temperature gradients of the input thermograms over time.

9. The method of claim 8, wherein the machine learning process further comprises an adaptive boosting technique to be used in conjunction with the CNN and the RNN to achieve higher accuracy of fouling predictions of heat exchangers.

10. A system for inspection of a heat exchanger, the system comprising:
a set of thermograms acquired over time using an infrared camera, the thermograms being of an outside of the heat exchanger; and
a prediction circuit comprising code executing in a processor, the code configuring the processor to:
determine a fouling of an inside of the heat exchanger using the thermograms; and
output an indication of the fouling,
wherein the prediction circuit is built from a machine learning process that learns from training data,
wherein the training data comprises other thermograms acquired over time of an outside of at least one heat exchanger, and
wherein the acquisition time of the training data includes a first time when an inside of the at least one heat exchanger exhibits no fouling and a second time when the inside of the at least one heat exchanger exhibits fouling.

11. The system of claim 10, further comprising environmental data of the heat exchanger acquired by one or more sensors and that corresponds to the thermograms, wherein
the code further configures the processor to determine the fouling by using the environmental data, and
the training data further comprises other environmental data of the at least one heat exchanger that corresponds to the other thermograms.

12. The system of claim 11, further comprising:
a training circuit configured by code to determine weights corresponding to the other environmental data, the weights respectively representing correlations of the other environmental data to affect the other thermograms; and
a machine learning circuit configured by code to build the prediction circuit using the weights, which compensate the thermograms by the environmental data when determining the fouling.

13. The system of claim 10, wherein the code further configures the processor to:
determine an extent of the fouling, the fouling extent comprising one or more of a length, a width, a depth, and an area; and
output the fouling extent,
wherein the training data further comprises an extent of the exhibited fouling of the at least one heat exchanger, the exhibited fouling extent comprising one or more of a length, a width, a depth, and an area.

14. The system of claim 10, wherein the code further configures the processor to:
determine a type of the fouling; and
output the fouling type,
wherein the training data further comprises a type of the exhibited fouling of the at least one heat exchanger.

15. The system of claim 14, wherein the fouling type and the exhibited fouling type each comprise polymer fouling.

16. The system of claim 10, wherein
the training data further comprises simulated or modified thermograms of the outside of the at least one heat exchanger, and
the simulated or modified thermograms are simulated or modified to exhibit another fouling of the inside of the at least one heat exchanger.

17. The system of claim 10, wherein the machine learning process comprises:
a convolutional neural network (CNN) to classify temperature gradients of input thermograms into different degrees of fouling; and
a recurrent neural network (RNN) to detect patterns in the temperature gradients of the input thermograms over time.

18. The system of claim 17, wherein the machine learning process further comprises an adaptive boosting technique to be used in conjunction with the CNN and the RNN to achieve higher accuracy of fouling predictions of heat exchangers.

19. The system of claim 10, further comprising a preprocessing circuit comprising code executing in a processor to apply a noise filter to the thermograms to reduce effects from noise prior to determining the fouling.

20. The system of claim 10, further comprising a wireless communication device configured to communicate between the infrared camera and the prediction circuit, the wireless communication device being attached to the infrared camera to receive the thermograms therefrom.

* * * * *